US006490054B1

(12) United States Patent
Matsui et al.

(10) Patent No.: US 6,490,054 B1
(45) Date of Patent: Dec. 3, 2002

(54) CODE IMAGE RECORDER FOR RECORDING AN OPTICALLY READABLE CODE IMAGE INCLUDING MARKERS AS REFERENCE INDEXES

(75) Inventors: Shinzo Matsui, Kitatsuru-gun (JP); Masahiko Mori, Iwate-gun (JP); Satoru Tsukihara, Iwate-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/366,078

(22) Filed: Aug. 3, 1999

(30) Foreign Application Priority Data

Aug. 6, 1998 (JP) ........................................... 10-223192

(51) Int. Cl.$^7$ ............................................. G06F 15/00
(52) U.S. Cl. ...................... 358/1.6; 358/1.5; 358/1.18; 358/1.16; 396/429
(58) Field of Search .......................... 358/1.9, 1.1, 1.5, 358/1.6; 369/14, 275.1; 235/494, 462.01; 396/310, 312, 315; 382/181, 182, 183

(56) References Cited

U.S. PATENT DOCUMENTS

| 5,866,895 | A |   | 2/1999 | Fukuda et al. ............... 235/494 |
| 5,896,403 | A |   | 4/1999 | Nagasaki et al. ............ 714/752 |
| 6,043,899 | A | * | 3/2000 | Morohashi et al. ......... 358/1.18 |
| 6,160,633 | A | * | 12/2000 | Mori .......................... 358/1.5 |
| 6,163,656 | A | * | 12/2000 | Yoshioka ..................... 396/429 |

FOREIGN PATENT DOCUMENTS

| JP | 56-86775 | 7/1981 |
| JP | 10-3509 | 1/1998 |

* cited by examiner

*Primary Examiner*—Mark Wallerson
*Assistant Examiner*—Twyler Lamb
(74) *Attorney, Agent, or Firm*—Frishauf, Holtz, Goodman & Chick, P.C.

(57) ABSTRACT

A code image recorder controls the quantity of heat for printing the part of a pattern to be printed to a high definition level so as to reduce the area of each of the dots of the printed pattern, while printing many identical dots in an overlapping fashion to solidly print the remaining part of the pattern within a short period of time by use of a single pulse of an energization signal. In order to achieve this objective, the number of columns of a code image data area is doubled and an all "0" column data is inserted into every other column of the code image data to double the level of resolution only in the column direction. Thereafter, the portion of the code image data to be solidly printed is transformed in such a way that it is filled with "1s".

15 Claims, 14 Drawing Sheets

|          | ROW 1 | ROW 2 | ROW 3 | ROW 4 | ROW 5 |
|----------|-------|-------|-------|-------|-------|
| COLUMN 1 | 0 | 1 | 1 | 1 | 0 |
| COLUMN 2 | 1 | 1 | 1 | 1 | 1 |
| COLUMN 3 | 1 | 1 | 1 | 1 | 1 |
| COLUMN 4 | 1 | 1 | 1 | 1 | 1 |
| COLUMN 5 | 0 | 1 | 1 | 1 | 0 |

FIG. 9A

|          | ROW 1 | ROW 2 | ROW 3 | ROW 4 | ROW 5 | ROW 6 | ROW 7 | ROW 8 | ROW 9 | ROW 10 |
|----------|-------|-------|-------|-------|-------|-------|-------|-------|-------|--------|
| COLUMN 1 | 0 | 0 | 1 | 0 | 1 | 0 | 1 | 0 | 0 | 0 |
| COLUMN 2 | 1 | 0 | 1 | 0 | 1 | 0 | 1 | 0 | 1 | 0 |
| COLUMN 3 | 1 | 0 | 1 | 0 | 1 | 0 | 1 | 0 | 1 | 0 |
| COLUMN 4 | 1 | 0 | 1 | 0 | 1 | 0 | 1 | 0 | 1 | 0 |
| COLUMN 5 | 0 | 0 | 1 | 0 | 1 | 0 | 1 | 0 | 0 | 0 |

FIG. 9B

|          | ROW 1 | ROW 2 | ROW 3 | ROW 4 | ROW 5 | ROW 6 | ROW 7 | ROW 8 | ROW 9 | ROW 10 |
|----------|-------|-------|-------|-------|-------|-------|-------|-------|-------|--------|
| COLUMN 1 | 0 | 0 | 1 | 1 | 1 | 1 | 1 | 0 | 0 | 0 |
| COLUMN 2 | 1 | 1 | 1 | 1 | 1 | 1 | 1 | 1 | 1 | 0 |
| COLUMN 3 | 1 | 1 | 1 | 1 | 1 | 1 | 1 | 1 | 1 | 0 |
| COLUMN 4 | 1 | 1 | 1 | 1 | 1 | 1 | 1 | 1 | 1 | 0 |
| COLUMN 5 | 0 | 0 | 1 | 1 | 1 | 1 | 1 | 0 | 0 | 0 |

FIG. 9C

|        | ROW 1 | ROW 2 | ROW 3 | ROW 4 | ROW 5 | ROW 6 |
|--------|-------|-------|-------|-------|-------|-------|
| COLUMN 1 | 0 | 0 | 1 | 0 | 1 | 1 |
| COLUMN 2 | 1 | 0 | 0 | 0 | 0 | 0 |
| COLUMN 3 | 0 | 0 | 0 | 0 | 1 | 1 |
| COLUMN 4 | 0 | 0 | 0 | 0 | 0 | 0 |
| COLUMN 5 | 0 | 1 | 1 | 1 | 0 | 0 |
| COLUMN 6 | 1 | 1 | 1 | 1 | 1 | 0 |
| COLUMN 7 | 1 | 1 | 1 | 1 | 1 | 0 |
| COLUMN 8 | 1 | 1 | 1 | 1 | 1 | 0 |
| COLUMN 9 | 0 | 1 | 1 | 1 | 0 | 0 |

FIG. 11A

|        | ROW 1 | ROW 2 | ROW 3 | ROW 4 | ROW 5 | ROW 6 | ROW 7 | ROW 8 | ROW 9 | ROW 10 | ROW 11 | ROW 12 |
|--------|-------|-------|-------|-------|-------|-------|-------|-------|-------|--------|--------|--------|
| COLUMN 1 | 0 | 0 | 0 | 0 | 1 | 0 | 0 | 0 | 1 | 0 | 1 | 0 |
| COLUMN 2 | 1 | 0 | 0 | 0 | 0 | 0 | 0 | 0 | 0 | 0 | 0 | 0 |
| COLUMN 3 | 0 | 0 | 0 | 0 | 0 | 0 | 0 | 0 | 1 | 0 | 1 | 0 |
| COLUMN 4 | 0 | 0 | 0 | 0 | 0 | 0 | 0 | 0 | 0 | 0 | 0 | 0 |
| COLUMN 5 | 0 | 0 | 1 | 1 | 1 | 1 | 1 | 0 | 0 | 0 | 0 | 0 |
| COLUMN 6 | 1 | 1 | 1 | 1 | 1 | 1 | 1 | 1 | 0 | 0 | 0 | 0 |
| COLUMN 7 | 1 | 1 | 1 | 1 | 1 | 1 | 1 | 1 | 0 | 0 | 0 | 0 |
| COLUMN 8 | 1 | 1 | 1 | 1 | 1 | 1 | 1 | 1 | 0 | 0 | 0 | 0 |
| COLUMN 9 | 0 | 0 | 1 | 1 | 1 | 1 | 1 | 0 | 0 | 0 | 0 | 0 |

FIG. 11B

CODE IMAGE RECORDER FOR RECORDING AN OPTICALLY READABLE CODE IMAGE INCLUDING MARKERS AS REFERENCE INDEXES

BACKGROUND OF THE INVENTION

This invention relates to a code image recorder which transforms input data concerning a piece of sound, image or text information into code image data conforming to a predetermined physical format, and which then prints/records the code image data as an optically readable code image on a predetermined recording medium.

U.S. Pat. Nos. 5,896,403 and 5,866,895 describe respective code image readers which optically read a dot code to be printed/recorded at a high density as an optically readable code image representing a piece of sound, image or text information, and which then reproduces the original piece of information in the form of sound, image or text.

FIG. 1 shows the physical format of a dot code 10 disclosed by the above cited U.S. Patents.

A plurality of blocks 12 are arranged two-dimensionally side by side and each of the blocks 12 comprises a data dot pattern region 14, markers 16, pattern dots 18 and a block address pattern 20. The data dot pattern region 14 is a region where the data of the block obtained by dividing the original data concerning a piece of information in the form of sound, image or text is arranged as a dot image formed by white dots or black dots representing respective bit values of "0s" or "1s" and arranged according to a predetermined format. The markers 16 operate as so many reference indexes to be used for locating the reference positions when reading the dots within the data dot pattern region 14. The markers 16 are located at the four corners of the block. Each marker 16 is formed of a predetermined number of black dots arranged sequentially. The pattern dots 18 are arranged in a line, which extends between two adjacent ones of the markers 16. The pattern dots 18, some of which are black and the others of which are white, are arranged in a prescribed pattern. The block address pattern 20 is arranged between a pair of markers of the block so that it may be identified when reading a plurality of different blocks. The data represented by the block address pattern 20 include the address data of the block and an error detection code or an error correction code.

FIG. 2 is a schematic block diagram of a code image reader 22 adapted to optically read such a dot code 10.

The code image reader 22 comprises at least an imaging section 24, an image memory 26, a binarization processing section 28, a binarized image memory 30, a restoring section 32, a demodulator section 34 and a reproducing section 36.

The imaging section 24 includes an illumination section typically comprising an LED for illuminating the dot code 10, an optical system for focussing the light reflected by the dot code 10 and a solid imaging device such as CCD for imaging the focussed image produced by the optical system. The image memory 26 stores the digital imaging signal obtained by digitizing the imaging signal output from the imaging section 24. The binarization processing section 28 reads out the digital imaging signal stored in the image memory 26 and binarizes the signal by means of a predetermined binarization threshold value. The binarized image memory 30 stores the binarized image data produced from the binarization processing section 28. The restoring section 32 reads out the binarized image data stored in the binarized image memory 30, detects the dots of the dot code and assigns "0" or "1" to each detected dot before it outputs the modulated data without processing it. The demodulator section 34 demodulates the modulated data output from the restoring section 32. The reproducing section 36 reproduces the data concerning the information in the form of sound, image or text demodulated by the demodulator section 34.

The code image reader 22 can read out the dot code if the dot code is sized to exceed the imaging field of the imaging section 24 as the imaging section 24 divides the dot code into frames and moves above the code image to sequentially pick up the dot code on a frame by frame basis. In other words, if the dot code 10 cannot be imaged by a single shot and can only be covered by a multiple of shots, it can be recognized and restored from the data of the blocks 12 once the addresses of the blocks 12 are read out and recognized. Thus, a large amount of information can be densely stored on a sheet of paper or some other medium to such an extent that conventional one-dimensional or two-dimensional bar codes can never achieve. Then, a long speech can be transmitted by way of a sheet of paper or some other medium to provide such a code image recorder with a wide variety of potential applications.

When reading out the binarized image data from the binarization image memory 30 and detecting each dot contained therein, the restoring section 32 firstly detects the markers 16 out of the binarized image data. Then, it searches the pattern dots 18 on the basis of the detected markers 16 and the information on the physical format and computationally determines reference positions for the operation of reading the block by minimizing the error function determined from the ideal center position of each of the pattern dots 18 contained in the above information on the physical format and the actually located center position thereof. Then, the restoring section 32 detects the center pixel of each of the dots to be read out within the data dot pattern region 14 and determines if the detected dot is a white dot or a black dot, to which a value of "0" of "1" is assigned so that a modulated data will be output for it.

Thus, if the highly densely printed/recorded code image shows a rather poor printing quality, the dot code will be read out correctly and a high quality reading operation will be guaranteed.

The demodulator section 34 restores the unmodulated original data as the original data concerning the information in the form of sound, image or text input to be recorded is modulated when a code image data is prepared therefrom. The modulation is carried out to facilitate the operation of the restoring section 32 of detecting the markers 16 to begin with. As a result of the operation of modulating the input data concerning the information in the form of sound, image or text, the number of consecutive black dots within the data dot pattern region 14 is made smaller than the number of consecutive black dots of the markers 16 in order to visually discriminate the dots within the data dot pattern region 14 and the markers 16.

For example, if the largest diametrical length of the marker 16 shown in FIG. 3 is equal to the length of five consecutively arranged black dots printed/recorded in the data dot pattern region 14, the input data concerning the information in the form of sound, image or text is modulated in such a way that the number of any consecutively arranged black dots contained therein may become less than five after the modulation.

Meanwhile, generally two methods are conceivable for printing/recording a highly dense dot code 10 on a sheet of paper. One is a method of printing the code to produce a large number of copies by means of a printing plate made by an image setter. The other is a method of using a printing technique such as thermal transfer or laser printing. The above cited U.S. Pat. No. 5,896,403 proposes the use of the above two methods for densely printing/recording a dot code 10 on a sheet of paper.

However, it has been found as a result of recent researches that the latter method of printing dot codes is accompanied by the following disadvantage.

When printing a dot code 10 by a thermal transfer type printing means, the control signal for heating each of the thermal recording elements of the thermal recording head is devised to make the area of a printed dot smaller than the recording area of the thermal recording element used for printing the dot.

Then, since each marker 16 is formed by arranging a plurality of dots side by side as minimal printing/recording units, gaps are inevitably produced within the printed/recorded marker 16 as a result of using such a technique of reducing the area to consequently produce a marker containing white spots therein. Then, it can be no longer possible to discriminate such a marker from a dot contained in the data dot pattern region 14 to give rise to a serious problem of operation errors on the part of the code image reader.

Since the copying means is provided by necessity with a mechanism for mechanically driving the recording medium such as a sheet of paper and the thermal recording head and the variances in the accuracy of operation of feeding paper of the mechanism is believed to promote the production of markers containing white spots therein.

Thus, for code images of the type under consideration including dot codes, reference indexes such as markers 10 that operate as references for reading dot codes take a vital role in the data reading operation and hence have to be printed/recorded highly accurately and reliably. Then, reference indexes can become visually defective when code images are printed/recorded by the printing means.

Reference indexes may be printed/recorded without white spots by uniformly controlling the timing of feeding paper for an entire code image or that of printing/recording an entire code image relative to the recording device by means of the technique disclosed in Japanese Patent Disclosure (KOKAI) No. 56-86775 or No. 10-3509 so that the printed dots may overlap each other. However, with either of the disclosed techniques, not only the dots of the reference indexes but also those in the data dot pattern region 14 can be printed/recorded in an overlapping manner. Then, some of the dots that are printed/recorded with a reduced size can become large as a result of overlapping to make it possible to print/record a code images highly densely.

BRIEF SUMMARY OF THE INVENTION

In view of the above circumstances, it is therefore the object of the present invention to provide a code image recorder adapted to accurately and reliably print/record reference indexes that operate as references for reading out an optically readable code image without adversely affecting the subsequent operation of reading the code image so that the code image may be printed/recorded highly densely.

According to an aspect of the present invention, there is provided a code image recorder adapted to modulate input data concerning a piece of sound, image or text information, and to form an image therefrom according to values of obtained modulated data so as to print the information on a predetermined recording medium as an optically readable code image by rendering a number of consecutive predetermined identical data values in the modulated data smaller than a number of consecutive predetermined identical data values contained in at least one optically readable reference index operating as a reference for reading the code image to make the modulated data discriminable from the optically readable reference index, the code image recorder comprising code image data generating means for receiving the modulated data and data constituting the reference index as input, and for generating code image data as a bit map corresponding to a physical format of the code image; and printing means for receiving the code image data generated by the code image data generating means, and for optically readably printing a corresponding code image on a predetermined recording medium, wherein an image corresponding to the consecutive predetermined identical data values is solidly printed only for the reference index in the code image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9A is a chart illustrating the data arrangement corresponding to an ideal marker image.

FIG. 9B is a chart illustrating the data arrangement obtained by carrying out the processing operation of step ST814 of FIG. 8 on the marker image data of FIG. 9A.

FIG. 9C is a chart illustrating the data arrangement obtained by carrying out the processing operation of step ST816 of FIG. 8 on the marker image data of FIG. 9B.

FIG. 11A is a chart of the data extracted from the code image data preserved in the code image data area in step ST812 of FIG. 8.

FIG. 11B is a chart of the data corresponding to the data of FIG. 11A obtained after step ST816 in FIG. 8.

DETAILED DESCRIPTION OF THE INVENTION

Now, the present invention will be described in greater detail by referring to the accompanying drawings that illustrate preferred embodiments of the invention.

Note that the dot code 10 shown in FIG. 1 and described above by referring to the prior art is a typical dot code to be dealt with the embodiments of code image recorder as will be described hereinafter.

1st Embodiment

Figure 4:
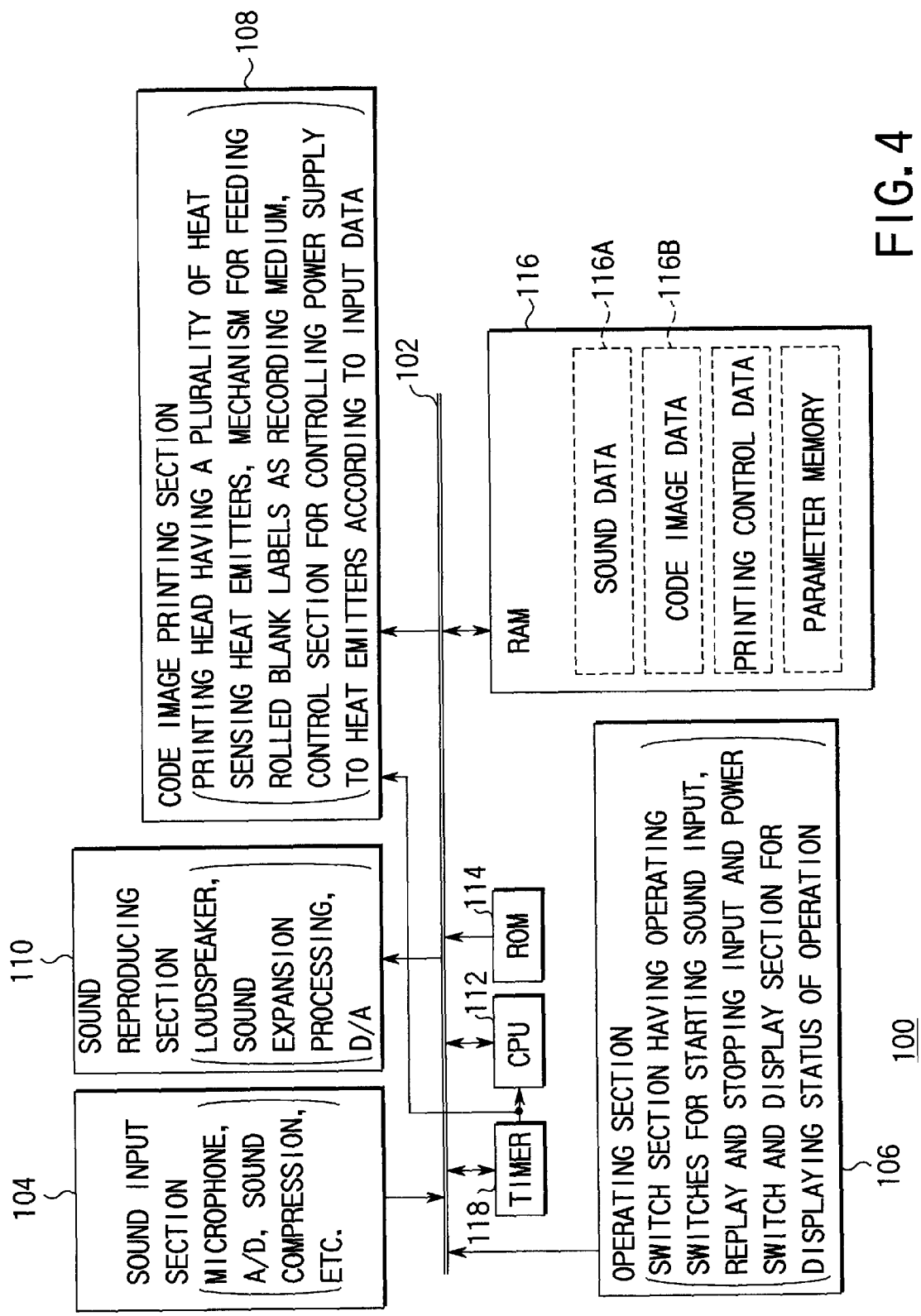
FIG. 4 is a schematic block diagram of a first embodiment of code image recorder according to the invention.

FIG. 4 is a schematic block diagram of a first embodiment of code image recorder according to the invention. Referring to FIG. 4, the code image recorder 100 comprises a sound input section 104, an operating section 106, a code image printing section 108, a sound reproducing section 110, a CPU 112, a ROM 114, a RAM 116 and a timer 118 connected to a CPU bus 102.

The sound input section 104 carries out an A/D conversion on the electric signal obtained by picking up a sound by means of a sensor such as a microphone to transform it into a digital data, which is then subjected to a predetermined compressing operation to produce a compressed data.

The operating section 106 is a user interface for operations including turning on/off the power switch for feeding the embodiment with power, a processing operation necessary for obtaining a proper timing for a sound input, confirming the reproduction of the stored sound and a processing operation necessary for controlling the operation of printing a code image.

The code image printing section 108 includes a printing head comprising a total of 150 thermal recording elements (heat emitters) arranged on a line at regular intervals of about 63.5 μm in order to produce a printed data such as a printed code image, a recording medium transfer mechanism for feeding a recording medium in a direction perpendicular relative to the line of thermal recording elements of the printing head, a cut out register for controlling ON/OFF operations in order to thermally control the thermal recording elements in time of the operation of recording a code image and a control section for controlling the printing operation in such a way that a dot image is recorded with a predetermined printing dot size by a single pulse of a timing signal from a timer 118 that will be described hereinafter when the value in the cut out register is "1" for a thermal recording element.

The sound reproducing section 110 expands the compressed data output from the sound input section 104 and carries out a D/A conversion on the data so that the sound corresponding to the data may be reproduced from a loudspeaker.

The CPU 112 controls the operation of each of the components and the overall operation of the embodiment through processing operations it carries out according to given programs.

ROM 114 stores programs for the CPU 112 and also various selected data including image pattern data for markers 16.

RAM 116 stores sound data in the form of compressed data generated before the CPU 112 processes the input sound data and feeds it to the code image printing section 108 as well as code image data, printing control data and various other data.

The timer 118 generates timing signals at temporal intervals selected by the CPU 112 and outputs them to the code image printing section 108. It also has a timer flag that can be read out by the CPU 112 and turns ON the timer flag at the above temporal intervals and OFF the timer flag each time it is read out by the CPU 112, while generating pulses for the timing signals.

Figure 5:
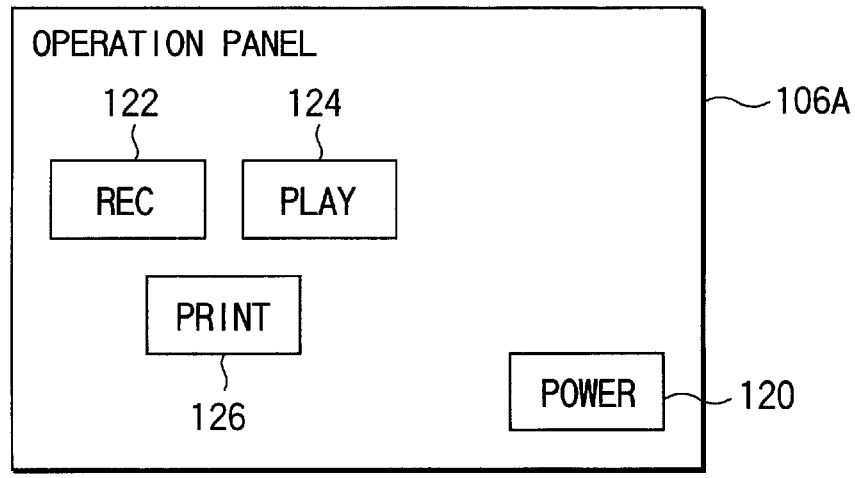
FIG. 5 is a schematic plan view of the operation panel of the operating section of the first embodiment of code image recorder, illustrating the positional arrangement of the operation buttons of the panel.

FIG. 5 is a schematic plan view of the operation panel 106A of the operating section 106 of the first embodiment of code image recorder, illustrating the positional arrangement of the operation buttons on the panel. As shown in FIG. 5, a "POWER" button 120, a "REC" button 122, a "PLAY" button 124 and a "PRINT" button 126 are arranged on the operation panel 106A.

The "POWER" button 120 is a button for controlling the power supply to the code image printer. The "REC" button 122 will be operated by the user each time he or she starts an operation of recording an input sound. The "PLAY" button 124 is a button to be operated to reproduce the input sound from the sound reproducing section 110. The "PRINT" button 126 will be operated to control the operation of printing a code image for the input sound by means of the code image printing section 108.

Now, the recording medium transfer mechanism of the code image printing section 108 will be described by referring to FIG. 6.

This code image printer 100 is designed to print a code image when a matching removable cassette 128 is mounted on the code image printing section 108. The cassette 128 contains a roll of blank labels 130 as recording medium and an ink ribbon 132 for transferring ink therefrom onto a blank label of the roll by means of the recording head that is thermally controlled.

The recording medium transfer mechanism contains a bobbin "#1" 134, a bobbin "#2" 136, a bobbin "#3" 138 and a platen roller 140 arranged within the cassette 128 along with the printing head 142 arranged within the code printer 100 main body and a drive section (not shown). The bobbin "#1" 134 is a bobbin carrying a roll of blank labels 130 and the bobbin "#2" 136 is a bobbin carrying an ink ribbon 132, while the bobbin "#3" 138 is a bobbin for taking up the ink ribbon 132 as the latter is used for printing. The platen roller 140 is designed to move the blank labels 130 along the direction indicated by arrows in FIG. 6. The printing head 142 is movable under the effect of a spring and pressed against the platen roller 140. The drive section (not shown) comprises a motor and adapted to put the ink ribbon 132 and the blank labels between the platen roller 140 and the printing head 142 and drive the platen roller 140 and the bobbin "#3" 138 to rotate simultaneously by the motor by way of a transmission mechanism typically comprising transmission gears.

Now, the operation of the CPU 112 of the code image printer 100 of this embodiment will be described by referring to the flow chart of FIG. 7.

Firstly, as the "POWER" button 120 is turned ON (step ST100), the code image printer 100 is initialized (step ST200). As a result of the initialization, the RAM 116 is checked for its memory and cleared and the D/A output of the sound reproducing section 119 is set to a silent state, while the recording medium transfer mechanism of the code image printing section 108 and the printing head 142 are brought into a stand-by state.

Then, the CPU 112 of the embodiment will wait for that anyone of the buttons of the operating section 106 is depressed by the user (steps ST300 through ST500).

If the "REC" button 122 is depressed and turned ON (step ST300), the sound input to the microphone of the sound input section 104 is taken in and A/D converted to become transformed into a digital data, which is then compressed and stored as compressed data in sound data area 116A of the RAM 116 by way of the CPU bus 102 (step ST600). Thereafter, the CPU 112 returns to the waiting state, in which it waits for that anyone of the buttons of the operating section 106 is depressed as described above by referring to the steps ST300 through ST500.

If, on the other hand, the "PLAY" button 124 is depressed (step ST400), the compressed sound data in the sound data area 116A of the RAM 116 is read out and processed for expansion by the sound reproducing section 110 before it is D/A converted and the recorded sound is reproduced typically through of a loudspeaker (step ST700). Thereafter, the CPU 112 returns to the waiting state, in which it waits for that anyone of the buttons of the operating section 106 is depressed as described above by referring to the steps ST300 through ST500.

If the "PRINT" button 126 is depressed (step ST500), the compressed sound data in the sound data area 116A is read out and transformed into a code image data, which is then output to the code image printing section 108 (step ST800). Then, the code image data is printed on a blank label 130 of the recording medium by the code image printing section 108. Thereafter, the CPU 112 also returns to the waiting state, in which it waits for that anyone of the buttons of the operating section 106 is depressed as described above by referring to the steps ST300 through ST500.

Now, the subroutine of the step ST800 in FIG. 7 will be described by referring to FIG. 8.

Firstly, in step ST810, the following processing operation will be carried out. The code image data area 116B of the RAM 116 is cleared and hence "0" is written into there. Then, the compressed sound data is read out from the sound data area 116A and a check parity and header information to be used for reading out the code image are added thereto. Then, the data is subjected to a modulating operation as described above to produce a dot arrangement data, which is then divided into blocks to produce a code image data arranged according to the physical format of FIG. 1. The produced code image data is then stored in the code image data area 116B of the RAM 116.

Figure 1:
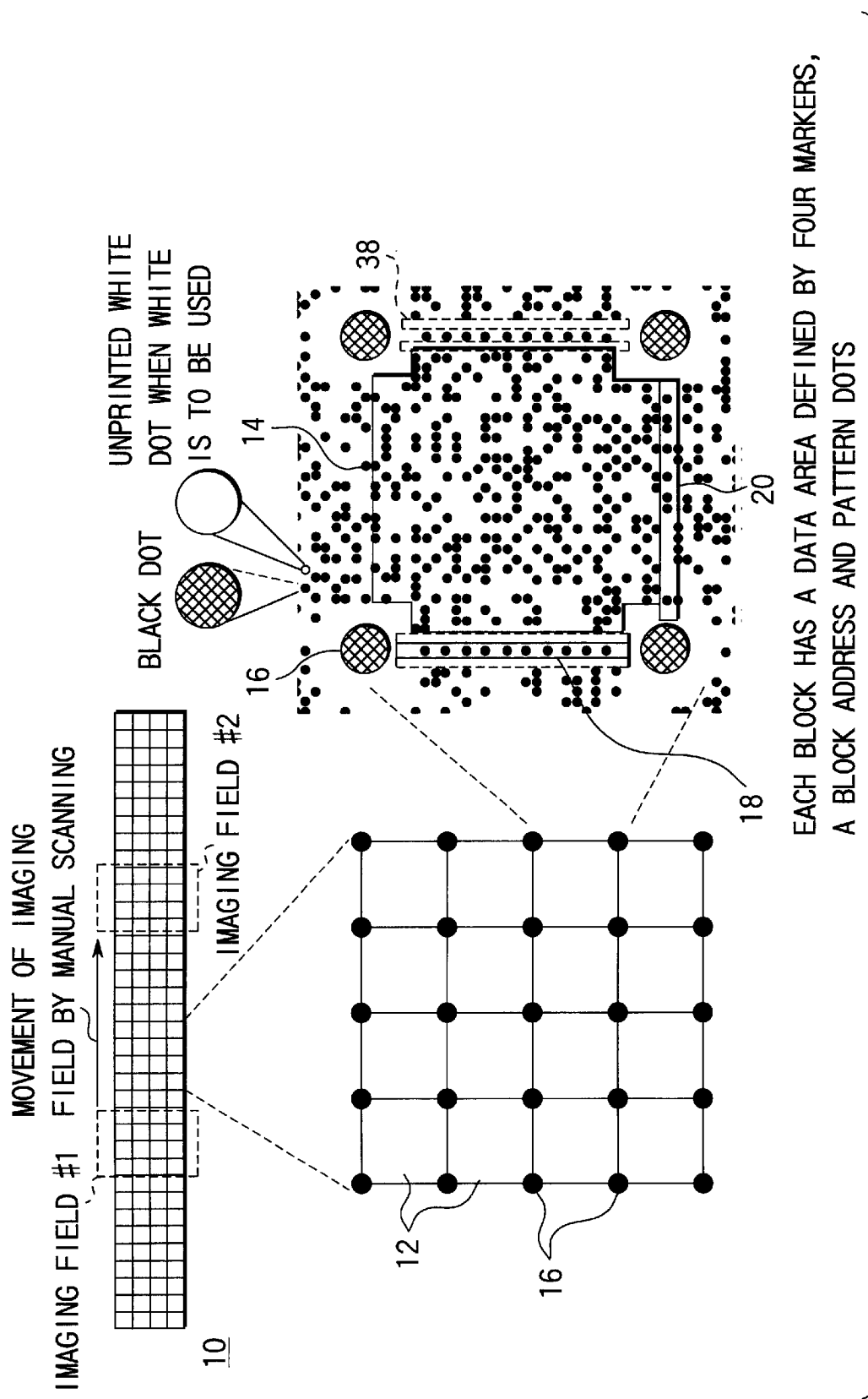
FIG. 1 is a schematic illustration of the physical format of a known dot code that can be recorded as code image by means of a code image recorder.
Figure 2:
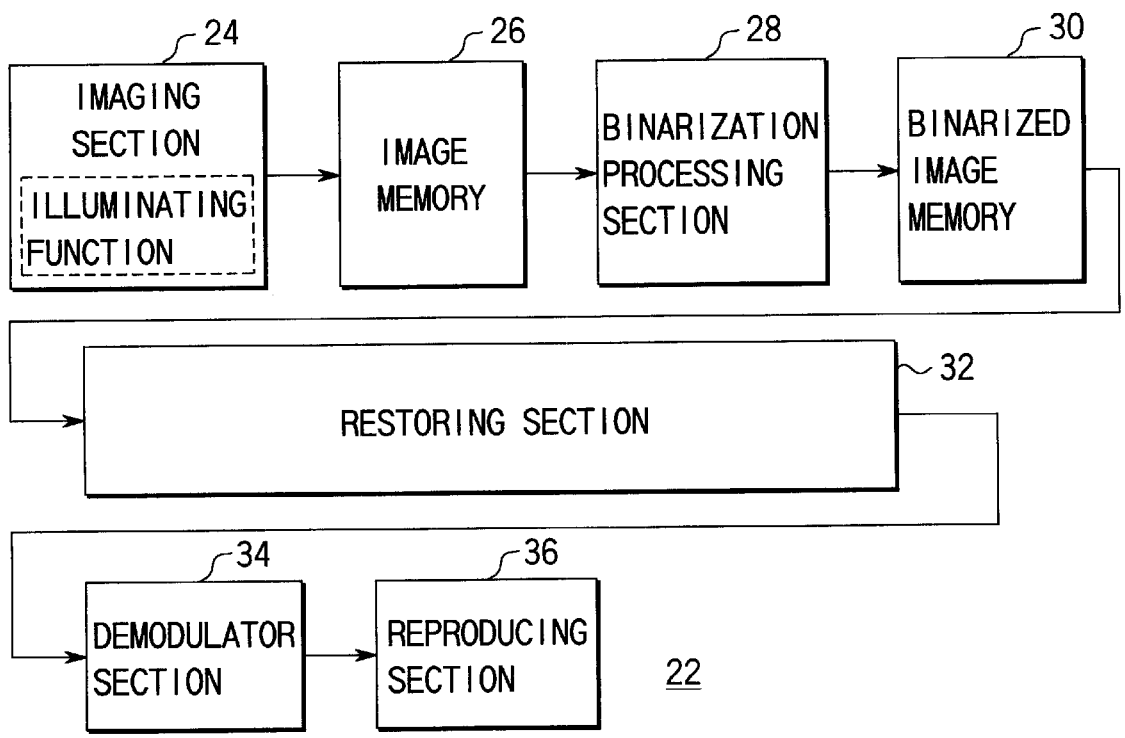
FIG. 2 is a schematic block diagram illustrating some of the functional blocks of a known code image recorder.

Note that, at this stage of operation, the code image data will be binarized image data containing 1-bit data of white or black, or "0" or "1", for each white or black dot of the dot code 10 as shown in FIG. 1. Therefore, the above code image data will be N*M binarized image data of a matrix of N rows and M columns, where a dot is represented by a bit and N represents the number of thermal recording elements of the printing head 142, which is equal to 150 as described above. Thus, the N*M binarized image data will be 150*M binarized image data. On the other hand, M represents a value relating to the stored time length of the sound and the above compressing operation and varies as a function of the stored sound. Thus, a code image data obtained by printing a code image of dots arranged linearly at regular intervals of 63.5 μm is a binarized image data with a degree of resolution of 400PI both longitudinally and transversally.

Then, in step ST812, the following processing operation will be carried out. The block address pattern 20 and the data corresponding to the pattern of the pattern dots 18 as shown in FIG. 1, and the marker image data of the markers 16 ideally corresponding to the marker image of FIG. 3 as shown in FIG. 9A are read out from the ROM 114 and overwritten on the code image data area 116B according to the above physical format.

Then, in step ST814, the following processing operation will be carried out. The number of columns of the code image data area is increased to twice of the current number and all "0s" column data is inserted for every other column for the code image data in order to shift the resolution to 800DPI only in the column direction. As a result, the marker image data portion of the code image data shown in FIG. 9A will be transformed to the one shown in FIG. 9B.

Then, in step ST816, the following processing operation will be carried out. Only the marker image data portion of the code image data is transformed so as to be filled with "1s". Thus, the marker image data shown in FIG. 9B will be transformed to the one shown in FIG. 9C.

Thereafter, in step ST818, the following processing operation will be carried out. The recording medium transfer mechanism of the code image printing section 108 is driven to feed the blank labels at a rate of 100 mm/s.

In step ST820, the following processing operation will be carried out. The cut out column K of the code image data is set to 1 and the timer 118 is started after setting the time interval of the timer to 317.5 μs, which is the time interval of printing two adjacent dot columns of the code image selected for printing the code image of dots arranged at a pitch of 63.5 μm with the above rate of label feeding. The expression of cutting out the code image data refers to an operation of reading the data of 150 dots, or a column, from the 150*M code image data and the expression of the cut out column K refers to the K-th column of the code image data.

Then, in step ST822, the following processing operation will be carried out. The K-th column of the code image data is cut out and the cut out data is transferred to the cut out register of the control section of the code image printing section 108 to make K=K+1.

Subsequently, in step ST824, the following processing operation will be carried out. The timer flag of the timer 118 is read out and this step is repeated until the timer flag is turned ON. Thus, this step S824 is used to control the timing of starting the operation of repeating the above step S822 and that of the transfer of the cut out data to the cut out register.

When the timer flag is turned ON, then in step ST826, the following processing operation will be carried out. It is determined if the number of cut out columns K is equal to the above M or not. If K=M, the processing operation proceeds to the next step ST828. If not, the processing operation returns to step S822 to repeats the above sequence.

When K=M, then in step S828, the following processing operation will be carried out. The timer 118 is stopped but the label feeding is continued for another second for the trailing margin of the label before the recording medium transfer mechanism is stopped. Then, the subroutine is terminated to complete the step ST800 of FIG. 7.

Figure 8:
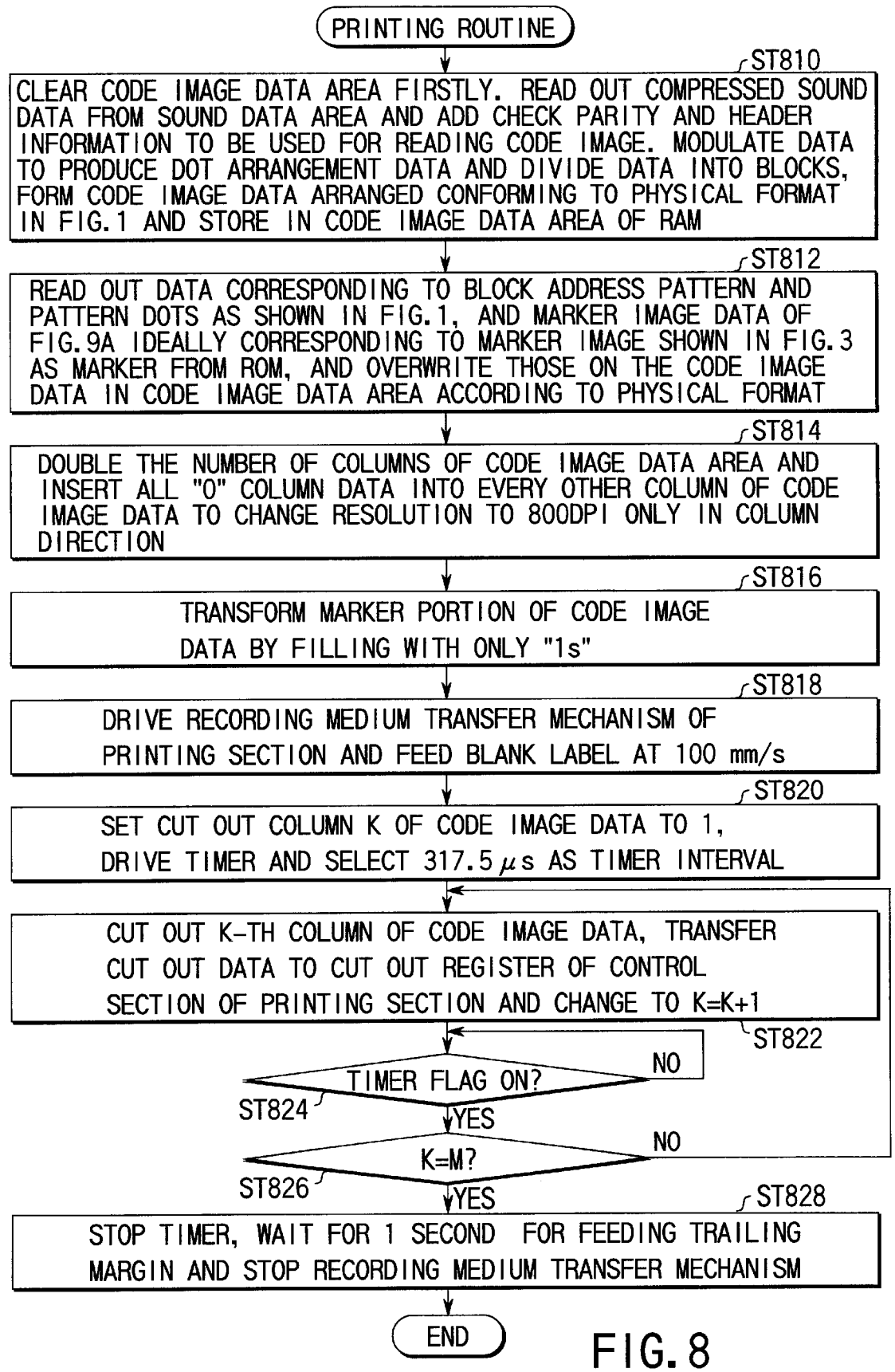
FIG. 8 is a flow chart of the printing subroutine in the flow chart of FIG. 7.
Figure 10:
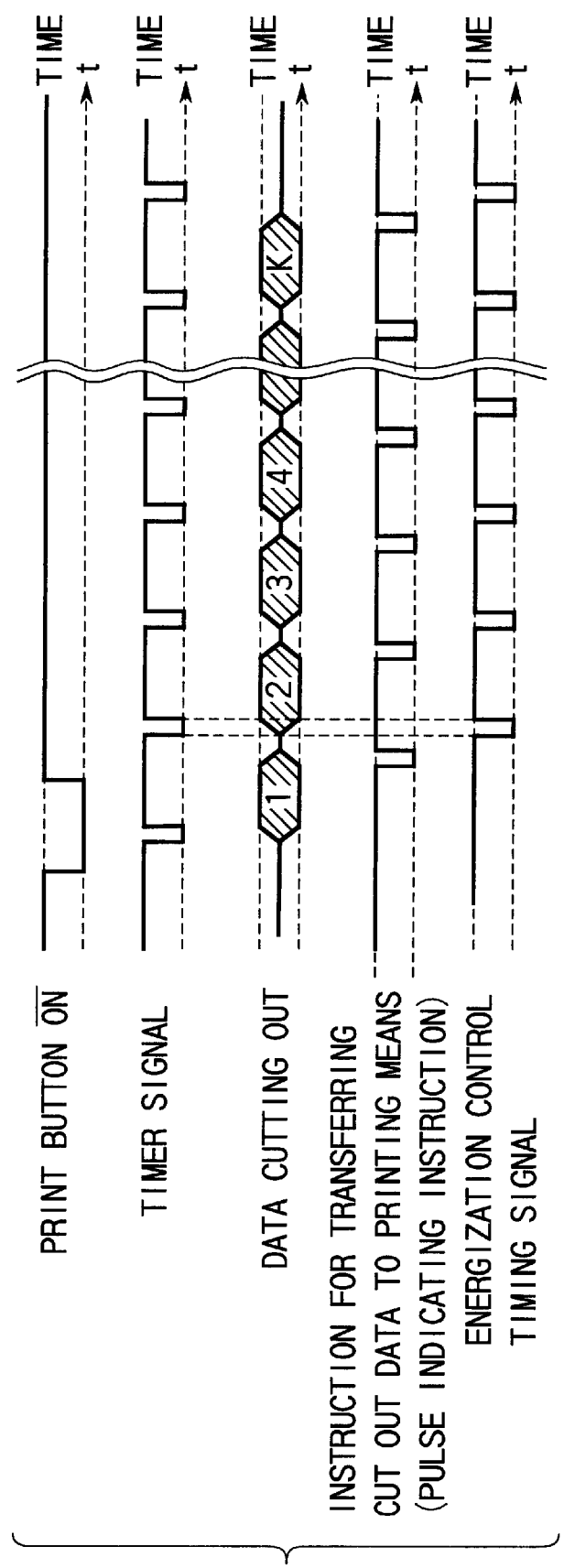
FIG. 10 is a timing chart illustrating the temporal relationship between the processing operation of the flow chart of FIG. 8 and the corresponding printing operation of the code image printing section.

FIG. 10 is a timing chart of the operation that takes place when the "PRINT" button 126 is depressed and shows the relationship between the timing of the processing operation of the flow chart of FIG. 8 and that of the printing operation of the code image printing section 108.

More specifically, when the "PRINT" button 126 is depressed, the timer 118 is started to generate a timer signal.

Then, an operation of cutting out the code image data is carried out according to the timer signal. Note that the numbers in the timing chart for the cutting out operation of FIG. 10 refer to the column numbers of the code image that are cut out and hence corresponds to K in FIG. 8.

Then, a data transfer instruction is issued to the code image printing section 108. The pulse of the transfer instruction indicates the timing of transferring the cut out data that is read out by the CPU 112 from the code image data area 116B to the code image printing section 108. In other words, it indicates the timing of writing the data into the cut out register and completing the above cutting out operation.

Thereafter, an energization control timing signal generated by the code image printing section 108 is used as a signal delayed by a pulse period of the timer signal and the energization of the printing head 142 is controlled according to the pulse of the timing signal to carry out the printing operation.

The printing operation may be started by the cut out data transfer instruction issued to the code image printing section 108. However, this transfer instruction is issued according to the processing time of the CPU 112 and the clock according to which the above timer signal is generated and the CPU clock according to which the CPU 112 operates may not necessarily agree with each other. Additionally, the processing time of the CPU 112 may vary depending on interrupts that may or may not occur. Thus, if the printing operation is triggered by the cut out data transfer instruction, errors can occur due to variations in the repetition cycle of the transfer instruction to give rise to variations in the positions of printed dots that may otherwise be caused by an inaccurate label feeding rate. According to the invention, the printing operation is started in synchronism with the energization control timing signal to suppress positional variations of printed dots.

The data shown in FIG. 11A are those cut out from the code image data stored in the code image data area 116B in the above step S812 and represents dots located close to a marker. More specifically, they include data for the marker 16, part 18A of the pattern dots 18, part of the pair of dotless areas 38 (see FIG. 1) arranged to sandwich the pattern dots 18 and part of the dots contained in the data dot pattern region 14.

FIG. 11B shows data for the portion of the code image same as that of FIG. 11A after the completion of the above step S816.

FIGS. 12A through 12H are illustrations showing the relationship between the timing of printing the portion of FIG. 11B and the printed pattern in different thermal recording elements (heat emitters).

Figure 12A:
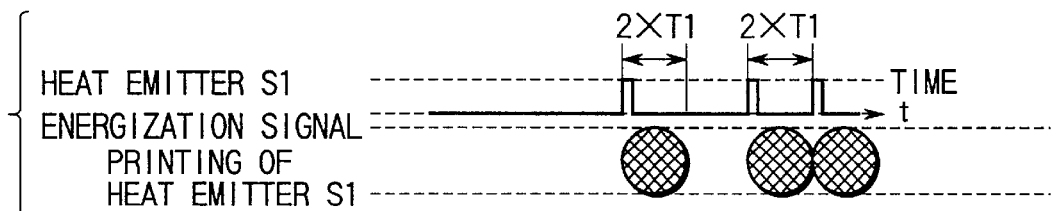
FIGS. 12A through 12H are illustrations showing the relationship between the timing of printing the data portion of FIG. 11B and the printed pattern in different heat emitters.
Figure 12B:
Figure 12C:
Figure 12D:
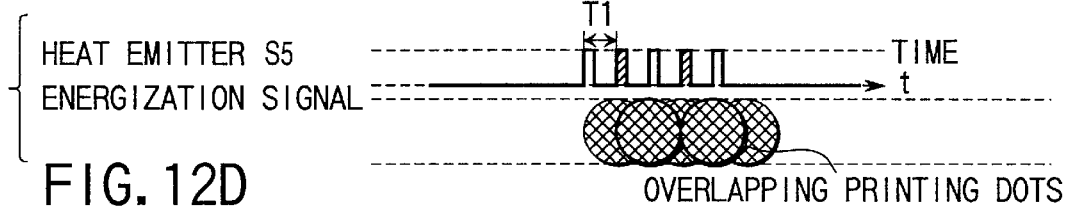
Figure 12E:
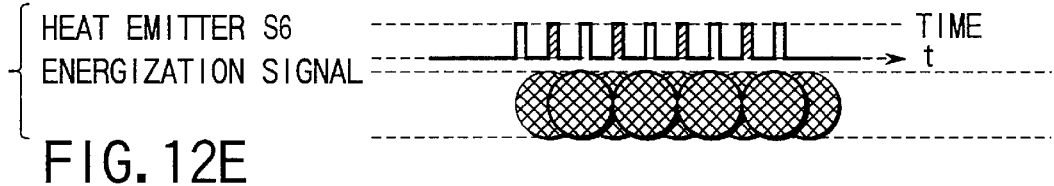
Figure 12F:
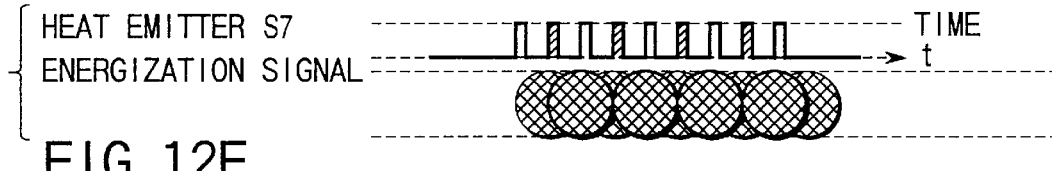
Figure 12G:
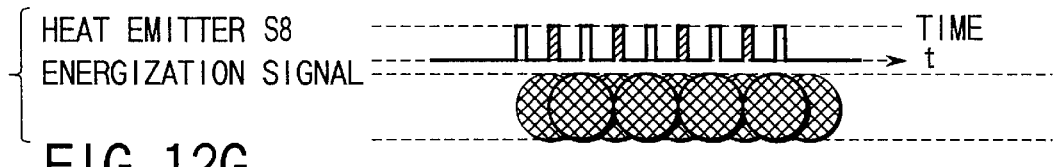
Figure 12H:
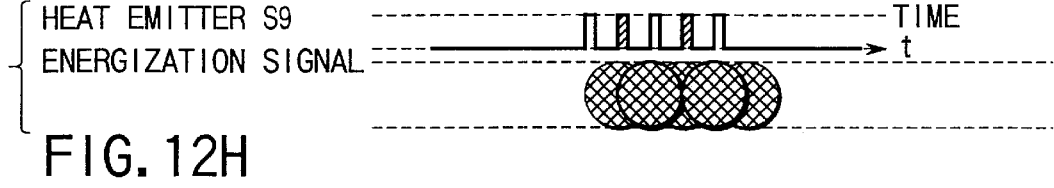

More specifically, FIGS. 12A through 12C show timing charts of the energization signals for the thermal recording elements S1 through S3 adapted to print dots according to the data for the columns 1 through 3 in FIG. 11B as well as the patterns of the printed dots. It will be appreciated that each of the thermal recording elements is thermally controlled so that the area of each dot printed by it is made smaller than the recording area of the thermal recording element.

Meanwhile, FIGS. 12D through 12H show timing charts of the energization signals for the thermal recording elements S5 through S9 adapted to print dots according to the data for the columns 5 through 9 in FIG. 11B as well as the patterns of the printed dots. It will be appreciated by comparing the patterns with those of FIGS. 12A through 12C that relatively a large number of dots of a predetermined size are tightly printed in an overlapping manner in a short printing period in the case of FIGS. 12D through 12H.

Figure 13:
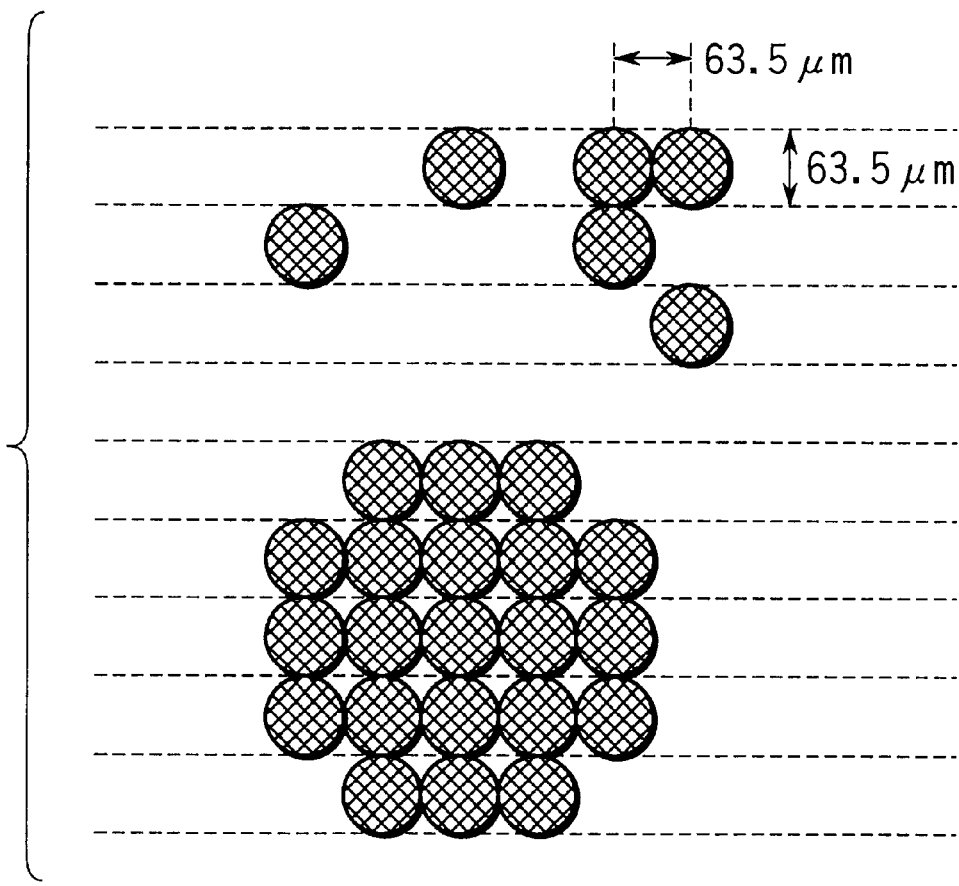
FIG. 13 is an illustration of the pattern of part of the code image of the data portion of FIG. 11A when dots are printed in an unoverlapping manner.

FIG. 13 shows the part of the code image for the data of FIG. 11A that is obtained without printing dots in an overlapping manner. This sort of pattern can be obtained by omitting the converting operation of filling the marker with "1s" in the step ST816 of FIG. 8.

Thus, while each of the dots in the data dot pattern region 14 is printed with an optimal size, the marker 16 shows white spots because it is not printed by overlapping dots. Then, the marker 16 will not be detected when the code image is read out by a dot code reader so that consequently the information on the original sound cannot be read out.

To the contrary, with this embodiment, since each marker 16 is obtained by printing dots in an overlapping manner while dots are densely printed in the data dot pattern region 14 of the dot code 10. Thus, the obtained marker 16 is free from white spots and hence reliably read out by the dot code reader so that consequently the information on the original sound can reliably readout.

Figure 6:
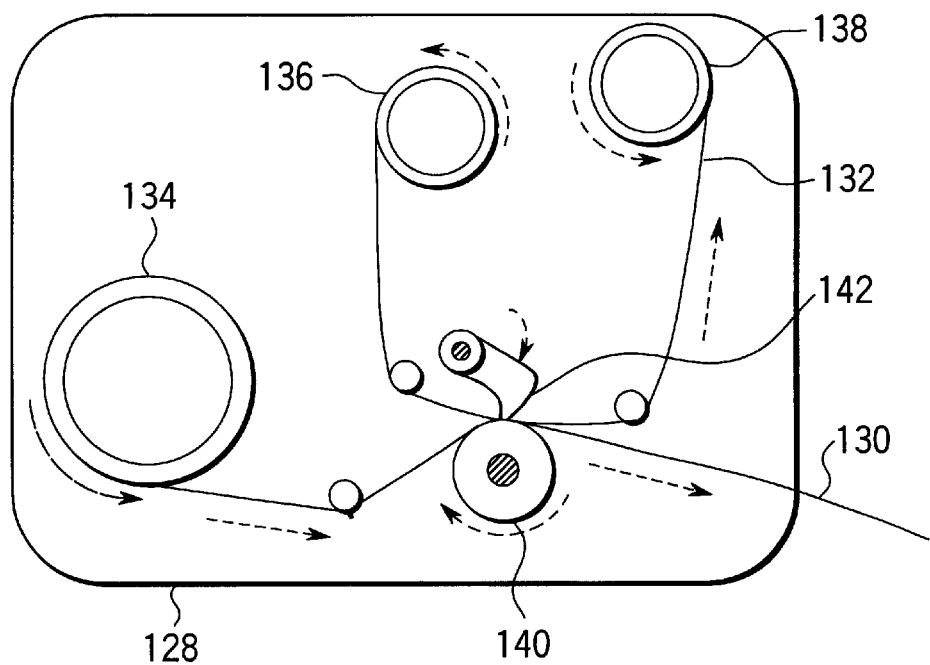
FIG. 6 is a schematic plan view of the recording medium transfer mechanism of the code image printing section of the first embodiment of code image recorder.

Additionally, a code image including such markers 16 can reliably be printed without showing white spots in the markers 16 by a printing means comprising a recording medium transfer mechanism as shown in FIG. 6 that is designed to feed blank labels only by the pressure of the platen roller 140 and the printing head 142 to reduce the cost and hence can show variances in the label feeding operation.

Now, the variances in the label feeding operation of the code image printing section 108 will be briefly discussed below.

As shown in the enlarged view of block 12 in FIG. 1, a pair of pattern dots 18 is arranged respectively between two pairs of upper and lower markers and each of the pattern dots 18 is sandwiched by a pair of vertically oblong dotless areas 38. The dotless areas 38 are provided for the dot code reader to easily detect the patterns dots 18 when leading the dot code 10.

When thermally and simultaneously printing a number of columns of dots for the dot code 10 as shown in FIG. 1 by means of a thermal printing head 142 comprising a plurality of thermal recording elements, the number of dots of a column containing pattern dots 18 and that of a column of a dotless area 38 differ from each other greatly so that the frictional resistance generated between the printing head 142 and the label 130 can vary remarkably between the two columns. Then, the net result will be that the platen roller 140 of the recording medium transfer mechanism slips frequently on the label 130 to give rise to local variances in the label feeding rate.

However, the code image recorder 100 of the above embodiment can reliably print markers 16 by printing dots in an overlapping fashion to overcome the above problem of local variances in the label feeding rate.

Additionally, the code image printing section 108 is so designed as to be driven typically with a predetermined energization period, a predetermined intensity of electric current and a predetermined number of times of energization to simplify the control circuit and reduce its cost so that dots with a constant size will be printed by a thermal recording element according to a single pulse of a timing signal from the timer 118 when the value of the cut out register of the thermal recording element is "1".

Figure 7:
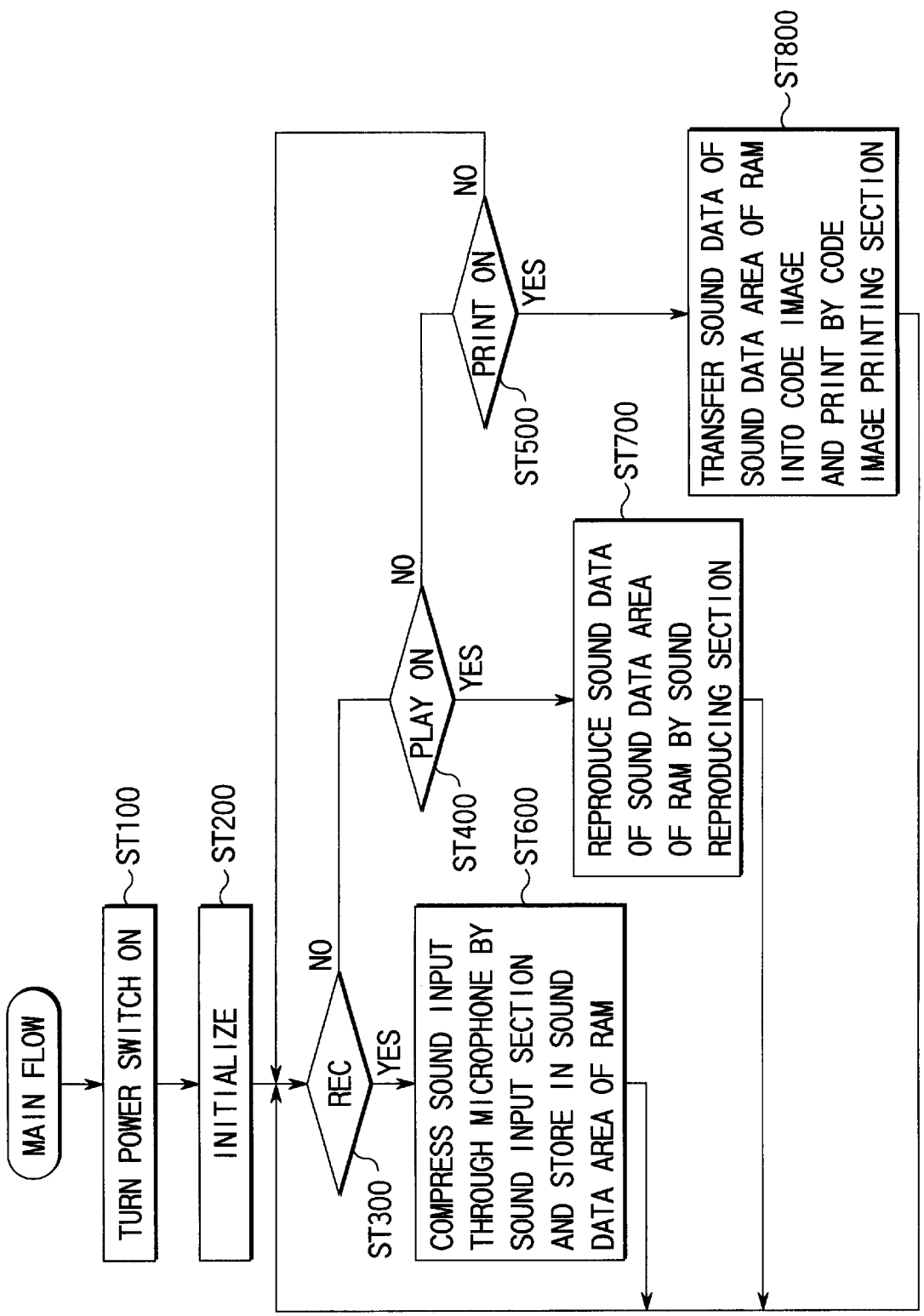
FIG. 7 is a flow chart of the operation of the CPU of the first embodiment of code image recorder.

Note that the flow charts of FIGS. 7 and 8 can be utilized to reliably print markers as reference indexes and record a code image highly densely if the code image printing section 108 is so arranged as to print dots by scanning the printing head 142 relative to the recording medium and not by transferring the recording medium as described above by referring to FIG. 6.

In short, as long as the recording medium and the printing head 142 are moved relative to each other, dots can be printed in an overlapping fashion in the direction of the relative movement to achieve the above described effect.

Figure 14:
FIG. 14 is an illustration of the pattern of dots in a data dot pattern where dots partly and accurately overlap.

In the first embodiment, dots are printed, each overlapping another, thus forming the markers 16, and the pattern dots are printed, each not overlapping another. Also in the first embodiment, the data dots are printed, each not overlapping another, in the data dot pattern region 14. If any two data dots are printed, adjacent to each other and side by side, a third dot may be printed as shown in FIG. 14, overlapping the adjacent ones and, thus, narrowing the space between the adjacent dots. In this case, the third dot must not cross the virtual line connecting the highest points of the adjacent dots or the connecting the lowest points of the adjacent dots.

However, it is not recommendable to print a dot on another black dot that is surrounded by white dots because the dot overlapping the latter will inevitably cross the border line of the latter to produce a large dot that can produce errors in the dot code reading operation.

2nd Embodiment

Now, a second embodiment of code image recorder according to the invention, which is a code image printer, will be described.

Since the code image printer of the second embodiment has a configuration similar to that of the first embodiment, it will not be described any further here except the difference.

The code image printer of this embodiment differs from the first embodiment only in part of the function of the code image printing section 108.

The code image printing section 108 comprises a printing head 142, a recording medium transfer mechanism, a cut out register for causing the CPU 112 to thermally control the operation of each of the thermal recording elements when recording a code image by driving simultaneously the thermal recording elements of the printing head 142, a solid printing indication register for issuing an instruction to each of the thermal recording elements for solid printing and a control section for thermally controlling the operation of the printing head 142 according to the data of the solid printing indication register and the data of the cut out register.

The thermal control of the code image printing section will be discussed in detail by referring to FIG. 15.

Figure 15:
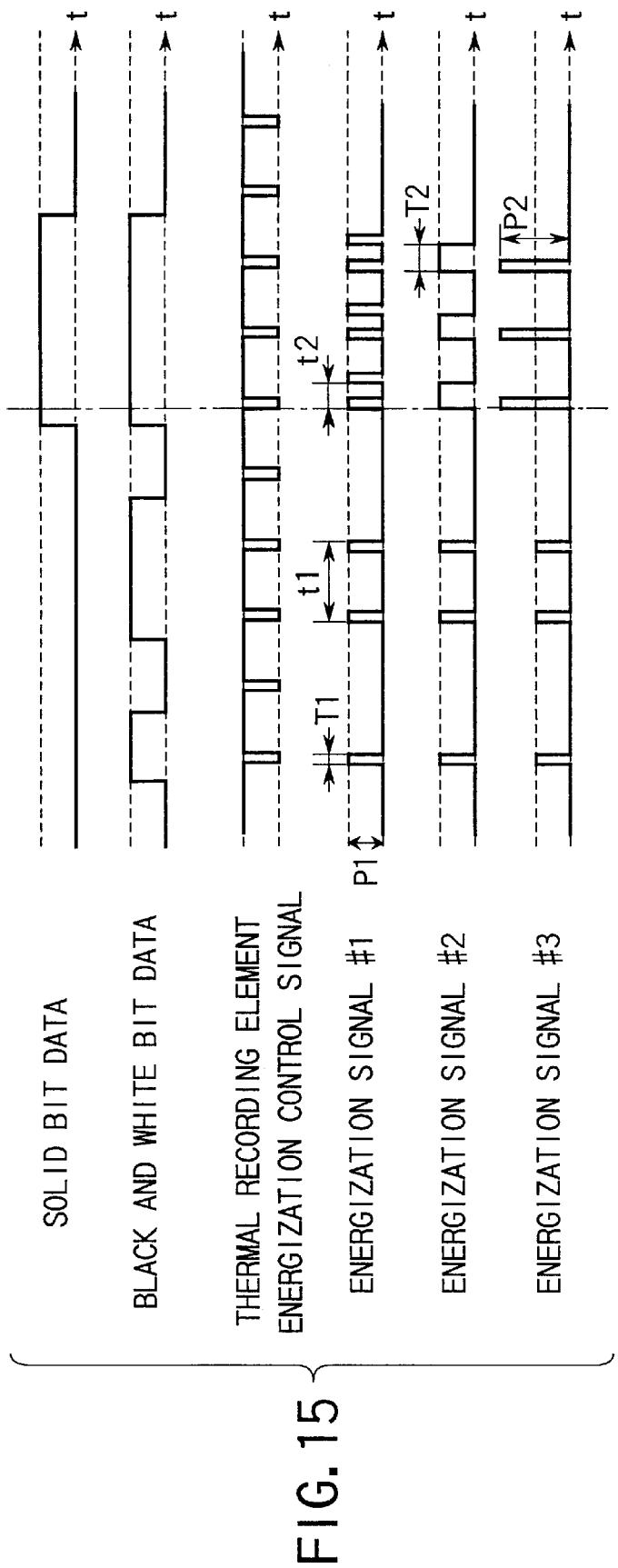
FIG. 15 is a timing chart of electric energization signals to be used in a second embodiment of code image recorder according to the invention.

As seen from FIG. 15, when the cut out register stores "0" for the corresponding thermal recording element, the latter does not print any dot. When, on the other hand, the value stored in the cut out register is "1" and the value of the solid printing indication register is "0", the thermal recording element is thermally so controlled as to print a dot of a predetermined size. When, finally, both the value stored in the cut out register and the value of the solid printing indication register are equal to "1", the thermal recording element is so controlled as to carry out a solid printing operation by the method of energization signal #1, #2 or #3 as shown in FIG. 15 or a composite method of the these three.

In the following description, the change with time of the value of each cut out register for the corresponding thermal recording element will be expressed as black and white bit data, whereas the change with time of the value of each solid printing indication register for the corresponding thermal recording element will be expressed as solid bit data.

Note that, according to the timing chart of FIG. 15, an energization signal is generated in synchronism with the timing of FIG. 10. More specifically, both the solid bit data and the black and white bit data will be modified by a data transfer instruction to the code image printing section 108 as shown in FIG. 10 and an energization control signal as shown in FIG. 15 is issued at the timing of the pulse of the energization control timing signal of FIG. 10.

As described above, energization signals #1, #2, #3 of FIG. 15 are based on solid bit data and represent three different energization methods. An actual printing operation is carried out by means of one of the three methods or a combination thereof.

The energization signal #1 feeds an electric current with an amplitude of P1 once for a period of T1 for black and white signal "1" and solid bit signal "0" in response to a generated energization control timing signal but it feeds an electric current with an amplitude of P1 twice for a period of T1 each for solid bit signal "1", the electric current showing pulses with an interval of t2 shorter than the shortest pulse interval t1 of the pulse output for printing a dot in an ordinary data dot pattern region 14. Note that the recording element is a resistor that generates heat when it is electrically energized and P1 represents the amplitude of the electric current.

The energization signal #2 feeds an electric current with an amplitude of P1 once for a period of T1 for black and white signal "1" and solid bit signal "0" in response to a generated energization control timing signal but it feeds an electric current with an amplitude of P1 once for a period of T2 that is longer than the ordinary T1 for solid bit signal "1".

The energization signal #3 feeds an electric current with an amplitude of P1 once for a period of T1 for black and white signal "1" and solid bit signal "0" in response to a generated energization control timing signal but it feeds an electric current with an amplitude of P2 that is greater than P1 once for a period of T1 for solid bit signal "1".

Figure 16:
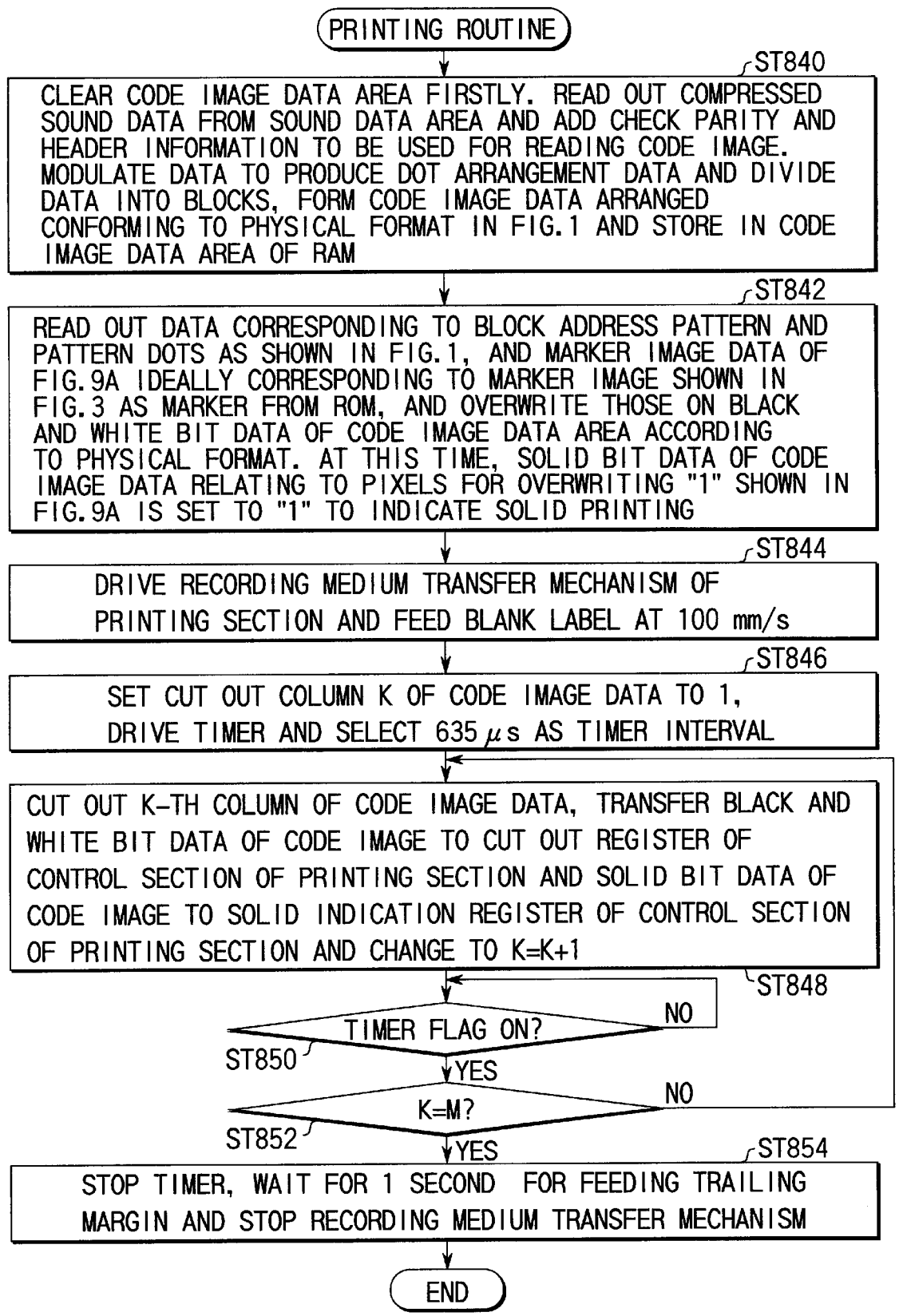
FIG. 16 is a flow chart of the printing subroutine of the operation of the second embodiment.

The operation of the CPU 112 of the code image printer of the second embodiment is identical with that of the CPU 112 of the first embodiment as shown in FIG. 7 except the subroutine of the step ST800. Therefore, only the step ST800 of this embodiment will be described below by referring to FIG. 16.

Firstly, in step ST840, the following processing operation will be carried out. The code image data area 116B of the RAM 116 is cleared and hence "0" is written there. Then, the compressed sound data is read out from the sound data area 116A and a check parity and header information to be used for reading out the code image are added thereto. Then, the data is subjected to a modulating operation as described above to produce a dot arrangement data, which is then divided into blocks to produce a code image data arranged according to the physical format of FIG. 1. The produced code image data is then stored in the code image data area 116B of the RAM 116.

Note that, at this stage, the code image data will be 2-bit data for each white or black dot of the dot code 10 as shown in FIG. 1, the 2-bit data including 1-bit data of white or black, or "0" or "1", and 1-bit solid bit data for "solid printing" or "non-solid printing".

The above code image data will be N*M code image data of a matrix of N rows and M columns, where a dot is represented by two bits and N represents the number of thermal recording elements of the printing head 142, which is equal to 150 as described above. Thus, the N*M dot image data will be 150*M ternarized image data. Thus, a code image data obtained by printing a code image of dots arranged linearly at regular intervals of 63.5 μm is a code image data with a degree of resolution of 400DPI both longitudinally and transversally.

Then, in step ST842, the following processing operation will be carried out. The block address pattern 20 and the pattern dots 18 as shown in FIG. 1 are read out from the ROM 114 along with the marker image data of FIG. 9A that ideally corresponds to the marker image of a marker 16 in FIG. 3 and then overwritten on the black and white bit data of the code image data area 116B according to the above described physical format. At this time, the solid bit data of the code image data on the pixels for overwriting "1" of the marker image data as shown in FIG. 9A will be set to "1" to indicate a solid printing.

Thereafter, in step ST844, the following processing operation will be carried out. The recording medium transfer mechanism of the code image printing section 108 is driven to feed the blank labels at a rate of 100 mm/s.

In step ST846, the following processing operation will be carried out. The cut out column K of the code image data is reduced to 1 and the timer 118 is started after setting the time interval of the timer to 635 μs, which is the time interval of printing two adjacent dot columns of the code image selected for printing the code image of dots arranged at a pitch of 63.5 μm with the above rate of label feeding.

Then, in step ST848, the following processing operation will be carried out. The K-th column of the code image data is cut out and the black and white bit data of the code image data is transferred to the cut out register of the control section of the code image printing section 108 while the solid bit data of the code image data is transferred to the solid printing indication register of the control section of the code image printing section 108 to make K=K+1.

Subsequently, in step ST850, the following processing operation will be carried out. The timer flag of the timer 118 is read out and this step is repeated until the timer flag is turned ON.

When the timer flag is turned ON, then in step ST852, the following processing operation will be carried out. It is determined if the number of cut out columns K is equal to the above M or not. If K=M, the processing operation proceeds to the next step ST854. If not, the processing operation returns to the step S848 to repeats the above sequence.

When K=M, then in step S854, the following processing operation will be carried out. The timer 118 is stopped but the label feeding is continued for another second for the trailing margin of the label before the recording medium transfer mechanism is stopped. Then, the subroutine is terminated to complete the step ST800 of FIG. 7.

Thus, with the second embodiment, markers 16 that are ideally printed solid can be printed so in a good condition for a code image.

Additionally, a code image including such markers 16 can reliably be printed without showing white spots in the markers 16 by a printing means comprising a recording medium transfer mechanism as shown in FIG. 6 that is designed to feed blank labels only by the pressure of the platen roller 140 and the printing head 142 to reduce the cost and hence can show variances in the label feeding operation.

Still additionally, the above described three thermal control methods are designed to print dots indicated as solid in a pattern of dots, each having a size greater than the predetermined dot size to be printed with ordinary thermal control so that markers 16 can reliably be printed according to a solid printing instruction.

3rd Embodiment

Now, a third embodiment of code image recorder according to the invention, which is a code image printer, will be described.

Since the code image printer of the second embodiment has a configuration similar to that of the first embodiment, it will not be described any further here except the difference.

Figure 17:
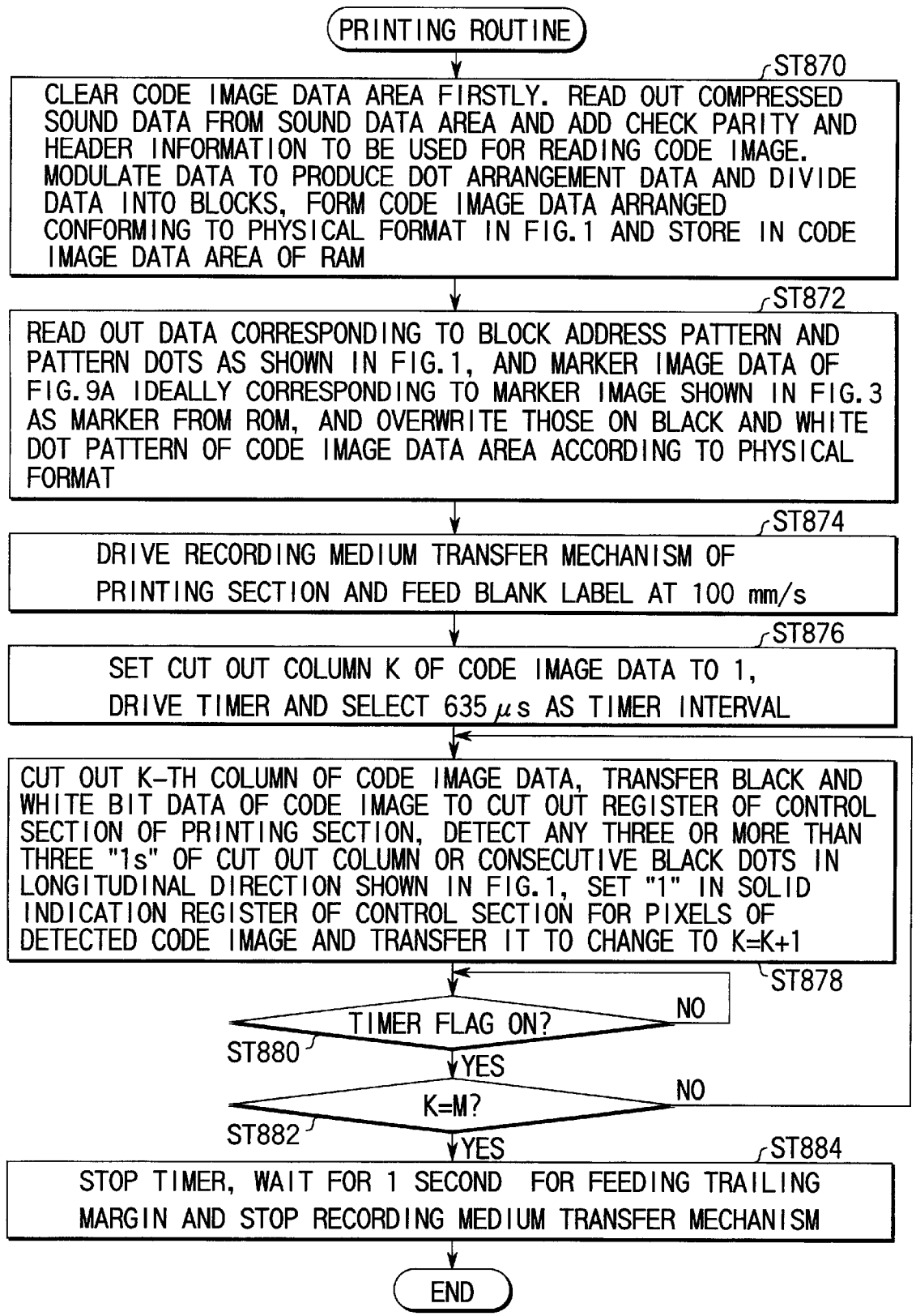
FIG. 17 is a flow chart of the printing subroutine of the operation of a third embodiment of code image recorder according to the invention.

The operation of the CPU 112 of the code image printer of the third embodiment is identical with that of the CPU 112 of the first embodiment as shown in FIG. 7 except the subroutine of the step ST800. Therefore, only the step ST800 of this embodiment will be described below by referring to FIG. 17.

Firstly, in step ST870, the following processing operation will be carried out. The code image data area 116B of the RAM 116 is cleared and hence "0" is written there. Then, the compressed sound data is read out from the sound data area 116A and a check parity and header information to be used for reading out the code image are added thereto. Then, the data is subjected to a modulating operation as described above to produce a dot arrangement data, which is then divided into blocks to produce a code image data arranged according to the physical format of FIG. 1. The produced code image data is then stored in the code image data area 116B of the RAM 116.

Note that, at this stage, the code image data will be binarized image data containing only including 1-bit data of white or black, or "0" or "1", for each white or black dot of the dot code 10 as shown in FIG. 1.

The above code image data will be N*M code image data of a matrix of N rows and M columns, where a dot is represented by a bit and N represents the number of thermal recording elements of the printing head 142, which is equal to 150 as described above. Thus, the N*M dot image data will be 150*M binarized image data. Thus, a code image data obtained by printing a code image of dots arranged linearly at regular intervals of 63.5 μm is a code image data with a degree of resolution of 400DPI both longitudinally and transversally.

Then, in step ST872, the following processing operation will be carried out. The block address pattern 20 and the pattern dots 18 as shown in FIG. 1 are read out from the ROM 114 along with the marker image data of FIG. 9A that ideally corresponds to the marker image of a marker 16 in FIG. 3 and then overwritten on the black and white bit data of the code image data area 116B according to the above described physical format.

Thereafter, in step ST874, the following processing operation will be carried out. The recording medium transfer mechanism of the code image printing section 108 is driven to feed the blank labels at a rate of 100 mm/s.

In step ST876, the following processing operation will be carried out. The cut out column K of the code image data is set to 1 and the timer 118 is started after setting the time interval of the timer to 635 μs, which is the time interval of printing two adjacent dot columns of the code image selected for printing the code image of dots arranged at a pitch of 63.5 μm with the above rate of label feeding.

Then, in step ST878, the following processing operation will be carried out. The K-th column of the code image data is cut out and the black and white bit data of the code image data is transferred to the cut out register of the control section of the code image printing section 108 while any three or more than three "1s" in the cut out register of the control section of the code image printing section 108 that are arranged longitudinally in FIG. 1 are detected and "1" is transferred and set in the solid printing indication register of the control section for the pixels of the markers in the detected code image to make K=K+1.

Subsequently, in step ST880, the following processing operation will be carried out. The timer flag of the timer 118 is read out and this step is repeated until the timer flag is turned ON.

When the timer flag is turned ON, then in step ST882, the following processing operation will be carried out. It is determined if the number of cut out columns K is equal to the above M or not. If K=M, the processing operation proceeds to the next step ST884. If not, the processing operation returns to the step S878 to repeats the above sequence.

When K=M, then in step S884, the following processing operation will be carried out. The timer 118 is stopped but the label feeding is continued for another second for the trailing margin of the label before the recording medium transfer mechanism is stopped. Then, the subroutine is terminated to complete the step ST800 of FIG. 7.

Figure 3:
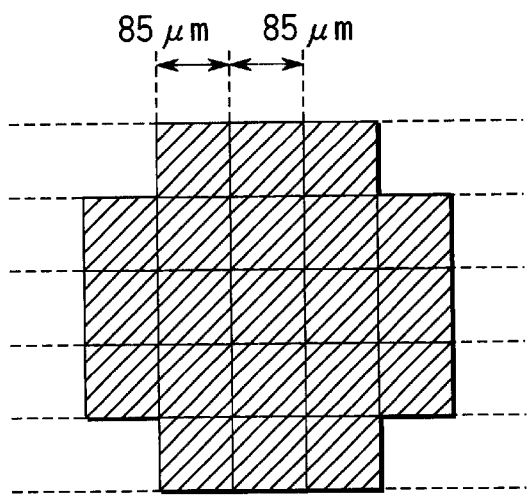
FIG. 3 is a schematic illustration of the dimensional relationship between a marker and black dots printed/recorded in a data dot pattern region.

Thus, a marker pattern as shown in FIG. 1 is constituted by three or more than three consecutively arranged black dots as shown in FIG. 3. Additionally, each of the dots in the data dot pattern region 14 is subjected to an above described modulation process so that more than two black dots will not be arranged longitudinally for recording.

Thus, three or more than three consecutively arranged dots are detected in the step S878 in order to identify a marker that should be solidly printed in black. Thus, the marker will be reliably detected and recorded to print a dot code in a good condition.

While three or more than three consecutively arranged dots are detected longitudinally in the above step ST878, they may alternatively be detected both longitudinally and transversally.

Still alternatively, if the dots in the data dot pattern region 14 are modulated both longitudinally and transversally, three or more than three consecutively arranged dots may be detected only transversally. Then, markers 16 may be produced by flatly printing dots by means energization signal #1, #2 or #3 along or by combining any of them.

As a result, markers 16 that should be ideally solidly recorded can be printed in a good condition for a code image.

Additionally, a code image including such markers 16 can reliably be printed without showing white spots in the markers 16 by a printing means comprising a recording medium transfer mechanism as shown in FIG. 6 that is designed to feed blank labels only by the pressure of the platen roller 140 and the printing head 142 to reduce the cost and hence can show variances in the label feeding operation.

Since any consecutive black dots are detected, the obtained code image will be binarized image data where a bit is used for a dot so that the memory capacity to be used for the code image data can be minimized.

In cases where the positions of markers that are to be printed solidly are not predictable, the above described technique of detecting consecutive black dots for code image data as used in the above third embodiment will be indispensable.

Thus, solidly printed markers as described above can be reliably detected to record a code image in a good condition in a code image recorder adapted to receive code image data and print/record a code image for the received data.

While the first through third embodiments are described above in terms of a dot code 10 as shown in FIG. 1, the present invention is by no means limited to dot codes 10 and applicable to code images in many other different formats.

Similarly, while the first through third embodiments are described in terms of a thermal transfer type printing means comprising thermal recording elements as shown in FIGS. 4 and 6, the present invention is by no means to thermal transfer systems and thermal sublimation type printing means, ink-jet type printing means and laser printing means using toner may also feasibly be used for the purpose of the present invention.

While the present invention is described above by way of embodiments, the present invention is by no means limited to the above embodiments, which may be modified in various different ways without departing from the scope of the invention. The present invention may be summarized as follows.

A code image recorder adapted to modulate input data concerning a piece of sound, image or text information and to form an image therefrom according to values of obtained modulated data so as to print the information on a predetermined recording medium as an optically readable code image by rendering a number of consecutive predetermined identical data values in the modulated data smaller than a number of consecutive predetermined identical data values contained in at least one optically readable reference index operating as a reference for reading the code image to make the modulated data discriminable from the optically readable reference index, the code image recorder comprising code image data generating means for receiving the modulated data and data constituting the reference index as input, and for generating code image data as a bit map corresponding to a physical format of the code image; and printing means for receiving the code image data generated by the code image data generating means, and for optically readably printing a corresponding code image on a predetermined recording medium, wherein an image corresponding to the consecutive predetermined identical data values is solidly printed only for the reference index in the code image.

With this arrangement, the reference indexes to be discriminated from the modulated data for a code image reading operation can be printed reliably and solidly so that consequently a high quality code image can be printed.

A code image recorder further comprising image data inserting means for inserting image data into the code image data generated by the code image data generating means in order to enhance a resolution of the code image data, wherein the image data inserting means is adapted to insert image data corresponding to a predetermined data value into image data of a part corresponding to the consecutive predetermined identical data values of the reference index in the code image data and also image data corresponding to the data concerning the piece of sound, image or text information and to a data value different from the predetermined data value into image data of a part corresponding to the consecutive predetermined identical data values in the modulated data, and the printing means is adapted to receive the code image data inserted to enhance the resolution by the image data inserting means as input and optically readably print a corresponding code image on the predetermined recording medium.

With the above arrangement, a code image containing both modulated data to be printed to a high definition level and reference indexes to be solidly printed can be reliably printed by the printing means.

A code image recorder wherein the printing means includes (i) a thermal recording head having a plurality of thermal recording elements arranged one-dimensionally over a predetermined length; and (ii) head drive control means for receiving the code image data of a high definition level containing the image data inserted by the image data inserting means as input and outputting a control signal for heating each of the thermal recording elements of the thermal recording head, wherein an ink ribbon having a coloring agent layer and the recording medium are sandwiched by the thermal recording head and a platen, the ink ribbon and the recording medium being adapted to be moved relatively to the thermal recording head in a direction rectangularly intersecting an arrangement line of the plurality of thermal recording elements, while melting the coloring agent of the ink ribbon by heating the thermal recording head and transferring the coloring agent onto the recording medium, and wherein the image data inserting means is adapted to insert the image data only in the direction of relative movement of the thermal recording head with respect to the recording medium.

With the above arrangement, the printing head is made to scan the recording medium with the ink ribbon interposed therebetween to record the code image without producing white spots in the reference indexes that can otherwise be given rise due to variances in the relative movement as a result of different numbers of black dots to be printed simultaneously for the code image data because the image data inserting means inserts the image data only in the direction of the relative movement. Thus, the code image recorder can print the code image reliably to a high quality.

A code image recorder wherein the printing means includes (i) a thermal recording head having a plurality of thermal recording elements arranged one-dimensionally over a predetermined length; and (ii) head drive control means for receiving the code image data of a high definition level containing the image data inserted by the image data inserting means as input and outputting a control signal for heating each of the thermal recording elements of the thermal recording head, wherein an ink ribbon having a coloring agent layer and the recording medium are sandwiched by the thermal recording head and a platen roller linked to a drive source, the ink ribbon and the recording medium being adapted to be driven by the platen roller to move in a direction rectangularly intersecting an arrangement line of the plurality of thermal recording elements, while melting the coloring agent of the ink ribbon by heating the thermal recording head and transferring the coloring agent onto the recording medium, and wherein the image data inserting means is adapted to insert the image data only in the direction of movement of the recording medium.

With the above arrangement, the printing means can be realized at low cost because the recording medium is driven to move only by the pressure between the printing head and the platen roller linked to the drive source and record the code image without producing white spots in the reference indexes that can otherwise be given rise due to variances in the relative movement that can arise in such a low cost printing means. Thus, the code image recorder can print the code image reliably to a high quality.

A code image recorder wherein the control signal output by the head drive control means to each of the thermal recording elements of the thermal recording head is an energization signal generated based on a value of each of bits of the code image data of an enhanced resolution level in order to heat each of the thermal recording elements of the thermal recording head.

Thus, with the above arrangement, the energization period, the number of times of energization and/or the amplitude of the electric current are controlled for the energization signal in correspondence to the high resolution level of the code image, while the solid printing of the reference indexes can be realized reliably by means of a simple circuit so that the code image recorder can be realized with an enhanced level of resolution at low cost.

A code image recorder wherein the code image contains at least a data dot pattern region containing a plurality of dots arranged two-dimensionally in correspondence to bit values of the modulated data and at least one marker operating as the at least one reference index and showing a predetermined positional relationship relative to the data dot pattern region so as to locate reference positions for reading the dots formed, the markers being produced by arranging side by side a plurality of dots, and wherein each of the dots is printed by heating one of the thermal recording elements of the thermal recording head.

With the above arrangement, the memory capacity necessary for the code image data can be reduced and the number of thermal recording elements can be minimized.

Additionally, a high density code image can be recorded conforming to the enhanced density level of the thermal recording head.

Thus, a code image recorder having an enhanced level of resolution can be provided at low cost.

A code image recorder wherein the printing means further includes detection means for detecting the image data corresponding to the reference index of the code image and is adapted to solidly printing an image corresponding to the detected image data.

Thus, with the above arrangement, the reference indexes are detected from the code image data and the detected reference indexes are solidly and reliably printed so that, if the reference indexes are not located in the code image in advance, the reference indexes can be reliably detected and then solidly printed to produce a high quality code image.

A code image recorder wherein the printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of the thermal recording head, and wherein the head drive control means is adapted to output as a control signal a pulse with a pulse interval shorter than a shortest pulse interval output for printing the image corresponding to the data concerning the piece of sound, image or text information in order to solidly print only the image corresponding to the part of the reference index containing consecutive predetermined identical data values.

With the above arrangement, the reference indexes that are to be discriminated from the modulated data can be solidly printed reliably in a simple manner to print a high quality code image.

A code image recorder wherein the printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of the thermal recording head, and wherein the head drive control means is adapted to output as a control signal a pulse with a pulse width longer than a pulse width output for printing the image corresponding to the data concerning the piece of sound, image or text information in order to solidly print only the image corresponding to the part of the reference index containing consecutive predetermined identical data values.

With the above arrangement, the reference indexes that are to be discriminated from the modulated data can be solidly printed reliably in a simple manner to print a high quality code image.

A code image recorder wherein the printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of the thermal recording head, and wherein the head drive control means is adapted to output as a control signal a pulse with a signal level higher than a signal level output for printing the image corresponding to the data concerning the piece of sound, image or text information in order to solidly print only the image corresponding to the part of the reference index containing consecutive predetermined identical data values.

With the above arrangement, the reference indexes that are to be discriminated from the modulated data can be solidly printed reliably in a simple manner to print a high quality code image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code image recorder adapted to modulate input data concerning a piece of sound, image or text information and to form an image therefrom according to values of obtained modulated data so as to print the information on a predetermined recording medium as an optically readable code image by rendering number of consecutive predetermined identical data values in the modulated data smaller than a number of consecutive predetermined identical data values contained in at least one optically readable reference index operating as a reference for reading the code image to make the modulated data discriminable from the optically readable reference index, said code image recorder comprising:

code image data generating means for receiving the modulated data and data constituting said reference index as input, and for generating code image data as a bit map corresponding to a physical format of the code image; and printing means for receiving said code image data generated by said code image data generating means, and for optically readably printing a corresponding code image on a predetermined recording medium, wherein an image corresponding to said consecutive predetermined identical data values is solidly printed only for said reference index in said code image.

2. A code image recorder according to claim 1, further comprising:

image data inserting means for inserting image data into the code image data generated by said code image data generating means in order to enhance a resolution of the code image data, wherein said image data inserting means is adapted to insert image data corresponding to a predetermined data value into image data of a part corresponding to said consecutive predetermined identical data values of the reference index in said code image data and also image data corresponding to the data concerning the piece of sound, image or text information and to a data value different from said predetermined data value into image data of a part corresponding to said consecutive predetermined identical data values in the modulated data, and said printing means is adapted to receive the code image data inserted to enhance the resolution by said image data inserting means as input and optically readably print a corresponding code image on the predetermined recording medium.

3. A code image recorder according to claim 2, wherein:

said printing means includes (i) a thermal recording head having a plurality of thermal recording elements arranged one-dimensionally over a predetermined length; and (ii) head drive control means for receiving the code image data of a high definition level containing the image data inserted by said image data inserting means as input and outputting a control signal for heating each of the thermal recording elements of said thermal recording head, an ink ribbon having a coloring agent layer and the recording medium are sandwiched by said thermal recording head and a platen, said ink ribbon and said recording medium being adapted to be moved relatively to said thermal recording head in a direction rectangularly intersecting an arrangement line of said plurality of thermal recording elements, while melting the coloring agent of the ink ribbon by heating the thermal recording head and transferring the coloring agent onto the recording medium, and said image data inserting means is adapted to insert said image data only in the direction of relative movement of said thermal recording head with respect to said recording medium.

4. A code image recorder according to claim 3, wherein:

said control signal output by said head drive control means to each of the thermal recording elements of said thermal recording head is an energization signal generated based on a value of each of bits of the code image data of an enhanced resolution level in order to heat each of the thermal recording elements of the thermal recording head.

5. A code image recorder according to claim 3, wherein:

said code image contains at least a data dot pattern region containing a plurality of dots arranged two-dimensionally in correspondence to bit values of the modulated data and at least one marker operating as the at least one reference index and showing a predetermined positional relationship relative to the data dot pattern region so as to locate reference positions for reading said dots formed, said at least one marker being produced by arranging side by side a plurality of dots, and each of said dots is printed by heating one of the thermal recording elements of said thermal recording head.

6. A code image recorder according to claim 2, wherein:

said printing means includes (i) a thermal recording head having a plurality of thermal recording elements arranged one-dimensionally over a predetermined length; and (ii) head drive control means for receiving the code image data of a high definition level containing the image data inserted by said image data inserting means as input and outputting a control signal for heating each of the thermal recording elements of said thermal recording head, an ink ribbon having a coloring agent layer and the recording medium are sandwiched by said thermal recording head and a platen roller linked to a drive source, said ink ribbon and said recording medium being adapted to be driven by said platen roller to move in a direction rectangularly intersecting an arrangement line of said plurality of thermal recording elements, while melting the coloring agent of the ink ribbon by heating the thermal recording head and transferring the coloring agent onto the recording medium, and said image data inserting means is adapted to insert said image data only in the direction of movement of said recording medium.

7. A code image recorder according to claim 6, wherein:

said control signal output by said head drive control means to each of the thermal recording elements of said thermal recording head is an energization signal generated based on a value of each of bits of the code image data of an enhanced resolution level in order to heat each of the thermal recording elements of the thermal recording head.

8. A code image recorder according to claim 6, wherein:

said code image contains at least a data dot pattern region containing a plurality of dots arranged two-dimensionally in correspondence to bit values of the modulated data and at least one marker operating as the at least one reference index and showing a predetermined positional relationship relative to the data dot pattern region so as to locate reference positions for reading said dots formed, said at least one marker being produced by arranging side by side a plurality of dots, and each of said dots is printed by heating one of the thermal recording elements of said thermal recording head.

9. A code image recorder according to claim 1, wherein:

said printing means further includes detection means for detecting the image data corresponding to the reference index of the code image and is adapted to solidly printing an image corresponding to the detected image data.

10. A code image recorder according to claim 9, wherein:

said printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of said thermal recording head, and said head drive control means is adapted to output as a control signal a pulse with a pulse interval shorter than a shortest pulse interval output for printing the image corresponding to the data concerning the piece of sound, image or text information in order to solidly print only the image corresponding to the part of said reference index containing consecutive predetermined identical data values.

11. A code image recorder according to claim 9, wherein:

said printing means includes (1) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of said thermal recording head, and said head drive control means is adapted to output as a control signal a pulse with a pulse width longer than a pulse width output for printing the image corresponding to the data concerning the piece of sound, image or text information in order to solidly print only the image corresponding to the part of said reference index containing consecutive predetermined identical data values.

12. A code image recorder according to claim 9, wherein:

said printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of said thermal recording head, and said head drive control means is adapted to output as a control signal a pulse with a signal level higher than a signal level output for printing the image corresponding to the data concerning the piece of sound, image or text information in order to solidly print only the image corresponding to the part of said reference index containing consecutive predetermined identical data values.

13. A code image recorder according to claim 1, wherein:

said printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of said thermal recording head, and said head drive control means is adapted to output as a control signal a pulse with a pulse interval shorter than a shortest pulse interval output for printing the image corresponding to the data concerning the piece of sound, image or text information in order to solidly print only the image corresponding to the part of said reference index containing consecutive predetermined identical data values.

14. A code image recorder according to claim 1, wherein:

said printing means includes (i) a thermal recording head having a plurality of thermal recording elements arranged one-dimensionally over a predetermined length; and (ii) head drive control means for receiving the code image data generated by the code image data generating means as input and outputting a control signal for heating each of the thermal recording elements of said thermal recording head, and said head drive control means is adapted to output as a control signal a pulse with a pulse width longer than a pulse width output for printing the image corresponding to the data concerning the piece of sound, image or text information in order to solidly print only the image corresponding to the part of said reference index containing consecutive predetermined identical data values.

15. A code image recorder according to claim 1, wherein:

said printing means includes (i) a thermal recording head having a plurality of thermal recording elements arranged one-dimensionally over a predetermined length; (ii) head drive control means for receiving the code image data generated by the code image data generating means as input and outputting a control signal for heating each of the thermal recording elements of said thermal recording head, and said head drive control means is adapted to output as a control signal a pulse with a signal level higher than a signal level output for printing the image corresponding to the data concerning the piece of sound, image or text information in order to solidly print only the image corresponding to the part of said reference index containing consecutive predetermined identical data values.

* * * * *

UNITED STATES PATENT AND TRADEMARK OFFICE
CERTIFICATE OF CORRECTION

PATENT NO. : 6,490,054 B1  Page 1 of 1
DATED : December 3, 2002
INVENTOR(S) : Shinzo Matsui et al.

It is certified that error appears in the above-identified patent and that said Letters Patent is hereby corrected as shown below:

<u>Title page,</u>
Item [73], Assignee, following "Olympus Optical Co., Ltd.," add
-- Alps Electric Co., Ltd., both of --

Signed and Sealed this

Twenty-second Day of July, 2003

JAMES E. ROGAN
*Director of the United States Patent and Trademark Office*